Figure 1:
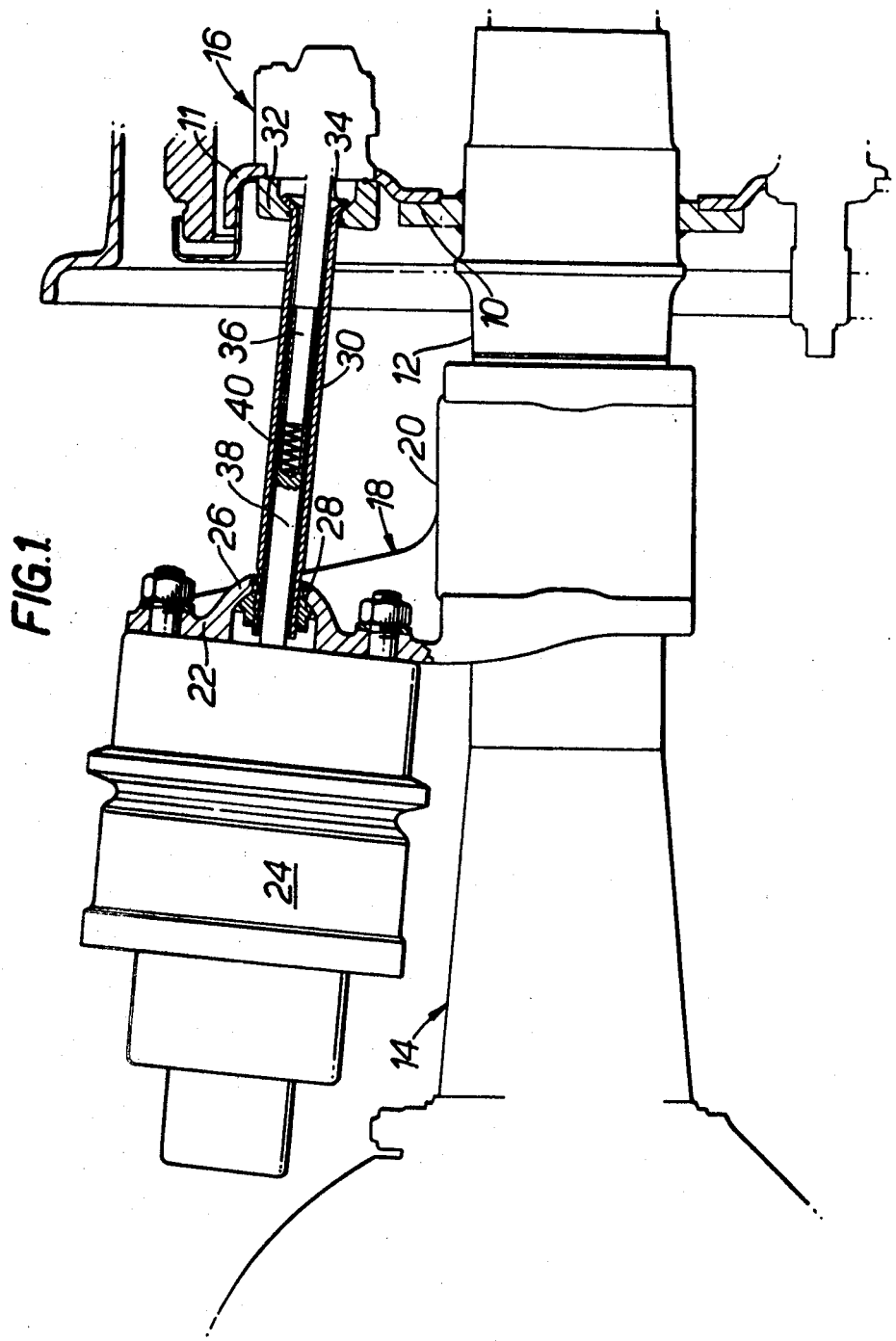

United States Patent

[11] 3,604,542

| | | |
|---|---|---|
| [72] | Inventor | John Leslie Cullen<br>Langley, England |
| [21] | Appl. No. | 883,130 |
| [22] | Filed | Dec. 8, 1969 |
| [45] | Patented | Sept. 14, 1971 |
| [73] | Assignee | Girling Limited<br>Birmingham, England |
| [32] | Priority | Dec. 30, 1968 |
| [33] | | Great Britain |
| [31] | | 61593/68 |

[54] VEHICLE BRAKE ACTUATOR MOUNTING
9 Claims, 2 Drawing Figs.

[52] U.S. Cl.................................................. 188/368,
188/18, 188/206
[51] Int. Cl....................................................... B60t 11/10,
F16d 65/32
[50] Field of Search........................................... 188/18, 18
A, 78 W, 152.85, 152.86, 206

[56] References Cited
UNITED STATES PATENTS
2,162,775  6/1939  Dick............................. 188/152 (.85)
3,322,241  5/1967  Cox et al....................... 188/152 (.85)

FOREIGN PATENTS
1,024,449  3/1966  Great Britain............... 188/152 (.85)
1,101,701  1/1968  Great Britain............... 188/152 (.85)

*Primary Examiner*—Duane A. Reger
*Attorney*—Scrivener, Parker, Scrivener and Clarke

ABSTRACT: In a fluid-operated vehicle brake assembly of the type wherein space considerations prevent the brake actuator from being assembled directly on to the brake torque plate and therefore require the brake actuator to be mounted on some form of extension arm or equivalent member which enables it to be positioned remotely from the torque plate, the invention provides a brake actuator mounting on a bracket rigidly connected to a vehicle axle assembly and a self-aligning tubular member acting between the bracket and the torque plate to contain the forces acting between them during a braking operation, the tubular member also acting as a housing for an actuator rod extending from the actuator and for a brake expander rod extending from a brake expander mounted on the torque plate the two rods being coupled together within the tubular member for enabling brake-actuating forces to be transmitted from the brake actuator to the brake expander.

VEHICLE BRAKE ACTUATOR MOUNTING

This invention concerns vehicle brakes.

In some vehicle constructions, the problem arises that a brake actuator cannot be assembled directly on to the relevant brake torque plate or backplate due to the presence of other components in the region of the vehicle concerned. This is particularly so in the case of fluid actuators, and especially pneumatic actuators, since the latter require pneumatic motor housings which are of relatively large diameter.

In such circumstances, it is usual to mount the actuator on some form of extension arm or equivalent member which spaces it away from the torque plate and places it in a position where it can more readily be accommodated. In an arrangement of this nature, however, the extension arm not only has to support the weight of the actuator by additionally has to absorb the stresses and strains which occur as a result of brake operation.

The invention seeks to provide a vehicle brake assembly in which these disadvantages are avoided.

According to the present invention, a fluid-operated brake assembly comprises a vehicle brake including a fixed torque plate located on a vehicle axle assembly, a fluid-operated actuator supported by a bracket rigidly connected to said axle assembly, a self-aligning tubular member extending between said bracket and said torque plate and provided at each of its ends with a self-aligning bearing, a seat member for receiving and locating the bearing at one end of said tubular member being fixed to said torque plate and said bracket including a seat for the bearing at the other end of said tubular member, an actuator rod extending from said actuator through said bracket and into one end of the tubular member, and a brake expander rod passing through said torque plate into the other end of said tubular member and being coupled to said actuator rod within said tubular member, said tubular member acting between said seats to contain the forces acting between said bracket and said torque plate during a braking operation.

By virtue of the bracket rigidly connected to the axle assembly, the invention thus provides for mounting of the actuator in a position which may be chosen for convenience having regard to the disposition of other vehicle components, while the tubular member acts as a self-aligning tie or strut, as the case may be, providing a reaction for the forces created between the bracket and the torque plate during braking.

One end of the tubular member may be integrally formed with the required bearing and the other end may carry a separately formed bearing member located upon it, as by threading. The separate bearing member may additionally serve to lock or secure the end of the tubular member within the bracket or the aforementioned seat member, as the case may be.

Figure 2:
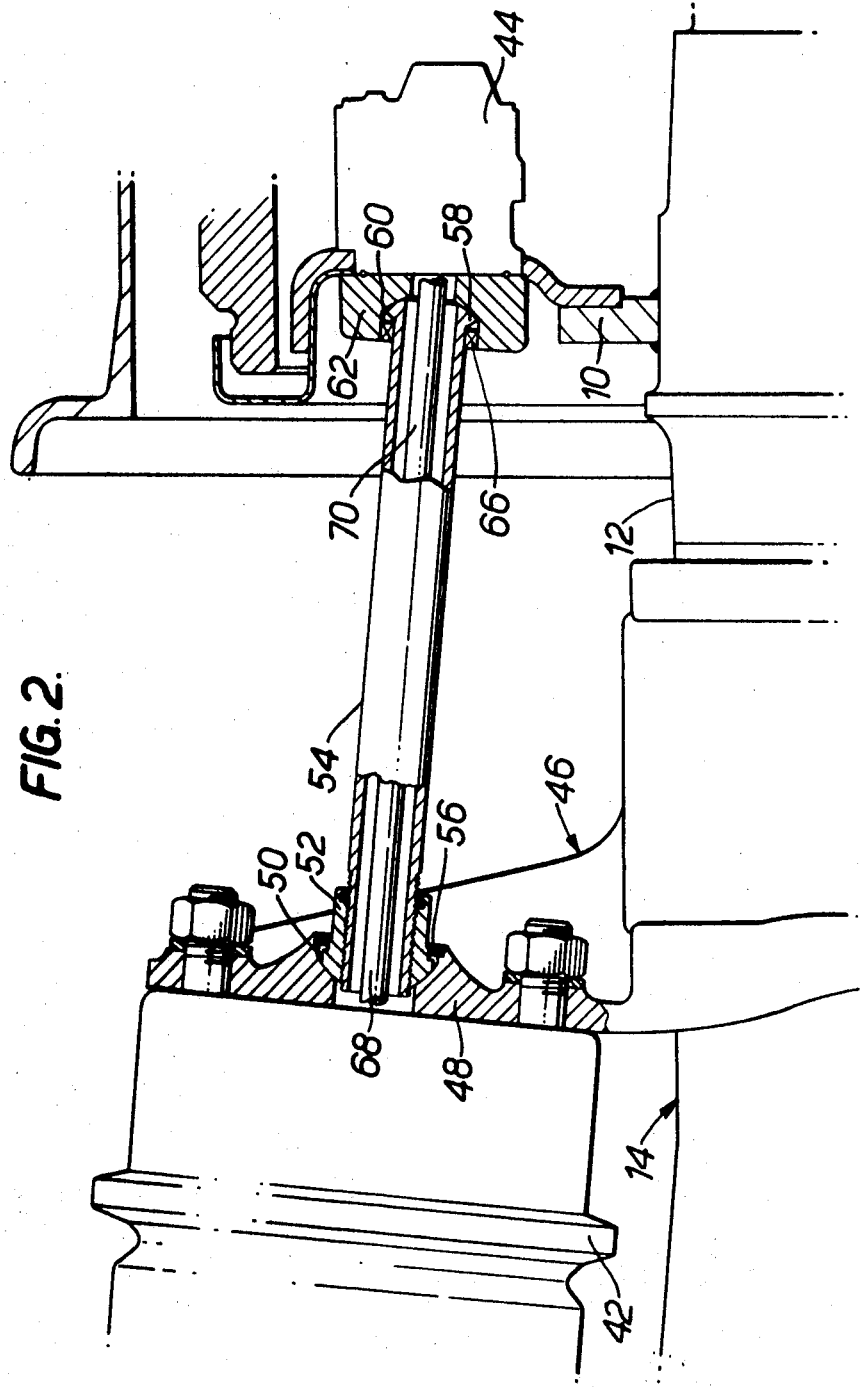

The invention will be described further, by way of example, with reference to the accompanying drawings, in which:

FIG. 1 is an elevation, partly in section, of one brake assembly embodying the invention, and FIG. 2 is a similar elevation of a second embodiment.

The brake assembly shown in FIG. 1 includes an axle flange 10 welded to the axle tube 12 of a vehicle wheel mounting generally designated 14, a brake expander 16 being fixed to a torque plate 11 bolted to the flange 10. A bracket 18 having a sleeve portion 20 rigidly mounted over the axle tube 12 is provided with a generally radially directed arm 22 to which is bolted a pneumatic motor 24 and the bracket arm 22 will be seen to be formed with a part-spherical depression defining a part-spherical seat 26 for a bearing member 28 having a complementarily shaped bearing surface which mates with the seat 26. The cooperating end of a tubular member 30 is passed through the crown region of the seat 26, which is apertured for this purpose, and is threaded to receive bearing member 28, which thereafter serves to locate the tubing member relative to and to retain it within the seat 26.

At its opposite end, the tubular member 30 is passed through a seat member 32 secured to the torque plate 11 opposite the brake expander 16, seat member being apertured to receive the tubular member. The latter, at the end concerned, is opened out to present a part-spherical bearing 34 which cooperates with a complementary seat surface formed internally of the seat member 32 and circumscribing the aperture therein. A brake expander rod 36 extending out of the brake expander 16 and towards the bracket arm 22 has its free end received within the hollow end of a brake actuator rod 38 and the arrangement is such that, when the pneumatic motor 24 is energized, the rod 38 moves to the right as viewed in the drawing, thereby pushing the expander rod in the same direction to operate the expander 16. A coil spring 40 is located in the hollow end of the actuator rod 38, as shown, to allow for any tolerance buildup which may occur in manufacture and assembly, to eliminate knocking and so forth.

The embodiment of the invention illustrated in FIG. 2 differs from that already described principally in that it employs a pneumatic motor 42 and a brake expander 44 which are pull operated rather than push operated. The bracket 46 accordingly has a radial arm 48 which is centrally thickened to accommodate a part-spherical bearing seat 50 serving to receive a complementarily shaped end of a bearing member 52. The bearing member 52 is threadedly engaged on one end of a tubular member 54 and is retained relative to the seat 50 by means of a circlip 56.

The opposite end of the tubular member 54 is formed with a convex bearing 58 which mates with a complementary part-spherical seat 60 of a seat member 62 secured to the torque plate 10 opposite the expander 44, the tubular member 54 being retained relative to the seat member 62 by a threaded ring 66 engaged in the latter. The motor pull rod 68 and the expander pull rod 70 are coupled together within the tubular member 54 and during a brake operation, the latter acts in compression to absorb the forces created between the bracket and the torque plate.

I claim:

1. A fluid-operated vehicle brake assembly comprising a vehicle brake including a fixed torque plate located on a vehicle axle assembly, a bracket member rigidly connected to said axle assembly, a tubular member extending between said bracket and said torque plate, a self-aligning bearing at each end of said tubular member to render said tubular member self-aligning between said bracket and torque plate, a seat member for receiving and locating the bearing at one end of said tubular member, said seat member being fixed to said torque plate, a seat on said bracket for the bearing at the other end of said tubular members, an actuator rod extending from said actuator through said bracket and and into one end of the tubular member, and a brake expander rod passing through said torque plate into the other end of said tubular member and being coupled to said actuator rod within said tubular member, said tubular member acting between said seats to contain the forces acting between said bracket and said torque plate during a braking operation.

2. A brake assembly as set forth in claim 1, wherein one of the self-aligning bearings on the tubular member is a separate bearing member located on said tubular member, the other bearing being integrally formed on said tubular member at the respective end thereof.

3. A brake assembly as set forth in claim 1, further comprising a sleeve portion on said bracket member, said sleeve portion being rigidly mounted over an axle tube of said axle assembly, and a generally radially directed arm extending from said sleeve and formed with the seat for the self-aligning bearing at said other end of said tubular member, said seat having a part-spherical configuration.

4. A brake assembly as set forth in claim 2, wherein said separate bearing member is in threaded engagement with said tubular member.

5. A brake assembly as set forth in claim 2, wherein said separate bearing member additionally serves to secure the adjoining end of the tubular member within the bracket member.

6. A brake assembly as set forth in claim 3, wherein said arm is formed with a part-spherical depression defining said part-spherical seat and the adjoining end of said tubular member passes through said arm to engage the self-aligning bearing at said adjoining end of said tubular member with said part-spherical seat.

7. A brake assembly as set forth in claim 3, said seat member being apertured to receive the end of the tubular member remote from the bracket member, said remote end of said tubular member being opened out to define said bearing and said bearing having a part-spherical configuration; and wherein said seat member is internally shaped to define a part-spherical seat surface complementary to said bearing and circumscribing the aperture in said seat member.

8. A brake assembly as set forth in claim 3, wherein the bearing located at the end of the tubular member adjoining the bracket in a separate bearing member and the radial arm of said bracket is centrally thickened, the thickened portion of said arm being formed with a bearing seat, said separate bearing member having an end complementary to and retained in said bearing seat.

9. A brake assembly as set forth in claim 8, wherein a convex bearing formed at the end of the tubular member remote from said separate bearing member is retained in a complementary seat of said seat member by a threaded ring engaged in said seat member.